(12) United States Patent
Sato et al.

(10) Patent No.: US 10,337,790 B2
(45) Date of Patent: Jul. 2, 2019

(54) REFRIGERATED STORAGE UNIT

(71) Applicant: MARS Company, Takasaki-shi, Gunma (JP)

(72) Inventors: Motohiko Sato, Tokyo (JP); Masaki Ohno, Takasaki (JP); Tadao Izutsu, Fujisawa (JP)

(73) Assignee: MARS Company, Takasaki-shi, Gunma-ken (JP)

( * ) Notice: Subject to any disclaimer, the term of this patent is extended or adjusted under 35 U.S.C. 154(b) by 7 days.

(21) Appl. No.: 15/518,468

(22) PCT Filed: Oct. 30, 2014

(86) PCT No.: PCT/JP2014/078957
§ 371 (c)(1),
(2) Date: Apr. 11, 2017

(87) PCT Pub. No.: WO2016/067421
PCT Pub. Date: May 6, 2016

(65) Prior Publication Data
US 2017/0234608 A1 Aug. 17, 2017

(51) Int. Cl.
*F25D 29/00* (2006.01)
*B60P 3/20* (2006.01)
(Continued)

(52) U.S. Cl.
CPC ....... *F25D 29/003* (2013.01); *B60H 1/00014* (2013.01); *B60H 1/00564* (2013.01);
(Continued)

(58) Field of Classification Search
CPC ...... H05K 7/20; F25D 29/003; B60H 1/00014
(Continued)

(56) References Cited

U.S. PATENT DOCUMENTS 3,499,295 A * 3/1970 Brennan
3,992,892 A * 11/1976 Sain ..................... B60H 3/0658
454/306
(Continued)

FOREIGN PATENT DOCUMENTS

EP 1510769 A1 3/2005
JP U-H5010970 2/1993
(Continued)

OTHER PUBLICATIONS

Translation of International Preliminary Report for International Application No. PCT/JP2014/078957 dated May 11, 2017, in 8 pages.
(Continued)

*Primary Examiner* — Steven B McAllister
*Assistant Examiner* — Samantha A Miller
(74) *Attorney, Agent, or Firm* — Knobbe, Martens, Olson & Bear, LLP

(57) ABSTRACT

A refrigerated storage unit 1 includes: a refrigeration chamber S2, a refrigeration part 3 for cooling air inside the refrigeration chamber S2, a fan 4 for sending cold air cooled by the refrigeration part 3 into the refrigeration chamber S2, a temperature sensor 5 for detecting a temperature inside the refrigeration chamber S2, an infrared sensor 8 for detecting a temperature of a content provided inside the refrigeration chamber S2, and a control part 7 for controlling driving of the fan based on a result detected by at least one of the temperature sensor 5 and the infrared sensor 8.

12 Claims, 9 Drawing Sheets

(51) Int. Cl.
   *F25D 17/06* (2006.01)
   *B60H 1/00* (2006.01)
   *F25D 11/00* (2006.01)
   *F25D 17/08* (2006.01)
(52) U.S. Cl.
   CPC ..... *B60H 1/00792* (2013.01); *B60H 1/00828* (2013.01); *B60P 3/20* (2013.01); *F25D 11/003* (2013.01); *F25D 17/06* (2013.01); *F25D 17/08* (2013.01); *F25D 2317/0651* (2013.01); *F25D 2317/0665* (2013.01); *F25D 2317/0682* (2013.01); *F25D 2400/28* (2013.01); *F25D 2400/30* (2013.01); *F25D 2700/12* (2013.01); *F25D 2700/123* (2013.01); *F25D 2700/16* (2013.01)
(58) Field of Classification Search
   USPC ............ 454/184, 75, 118, 341; 62/407, 408
   See application file for complete search history.

(56) References Cited

U.S. PATENT DOCUMENTS

| | | | | |
|---|---|---|---|---|
| 4,553,403 | A * | 11/1985 | Taylor | F25D 17/08 34/225 |
| 4,840,040 | A * | 6/1989 | Fung | |
| 5,101,643 | A * | 4/1992 | Hicke | B60P 3/20 108/51.11 |
| 5,129,235 | A * | 7/1992 | Renken | B60H 1/3232 454/90 |
| 5,809,798 | A * | 9/1998 | Clarke | B60P 3/20 62/239 |
| 6,010,399 | A * | 1/2000 | Lee | H01L 21/67259 414/935 |
| 6,116,044 | A * | 9/2000 | Gothier | B60P 3/20 454/118 |
| 6,508,076 | B1 * | 1/2003 | Gast | B65D 88/745 454/137 |
| 6,746,323 | B1 * | 6/2004 | Digby, Jr. | B60H 1/00378 454/119 |
| 7,310,969 | B2 * | 12/2007 | Dale | B65D 88/121 454/118 |
| 7,351,136 | B2 * | 4/2008 | Nelson | B60H 1/00364 454/118 |
| 7,784,707 | B2 * | 8/2010 | Witty | G01D 9/005 236/51 |
| 8,794,187 | B2 * | 8/2014 | Smith | B60P 3/04 119/401 |
| 8,870,990 | B2 * | 10/2014 | Marks | E21B 43/26 166/244.1 |
| 9,290,121 | B2 * | 3/2016 | Garg | F25D 3/06 |
| 9,459,037 | B2 * | 10/2016 | Wood | F25D 15/00 |
| 9,854,714 | B2 * | 12/2017 | Shedd | F25B 23/006 |
| 9,873,547 | B2 * | 1/2018 | Tippmann | B65D 19/38 |
| 10,184,699 | B2 * | 1/2019 | Shedd | F25B 23/006 |
| 2009/0127256 | A1 * | 5/2009 | Norris, Jr. | B60H 1/00014 220/1.5 |
| 2009/0318068 | A1 * | 12/2009 | Iida | B60H 1/00742 454/75 |
| 2010/0068984 | A1 * | 3/2010 | Hansson | H05B 1/0244 454/184 |
| 2010/0144261 | A1 * | 6/2010 | Barkic | B60H 1/00457 454/75 |
| 2014/0170949 | A1 * | 6/2014 | Dwiggins | B60H 1/00585 454/75 |
| 2015/0079890 | A1 * | 3/2015 | Stutzman | B01D 46/10 454/49 |
| 2016/0120019 | A1 * | 4/2016 | Shedd | H05K 1/0204 361/679.47 |

FOREIGN PATENT DOCUMENTS

| | | |
|---|---|---|
| JP | H 06-341747 A | 12/1994 |
| JP | H 10-311649 A | 11/1998 |
| JP | H 11-257828 A | 9/1999 |
| JP | 2002-115948 | 4/2002 |
| JP | 2010-043763 | 2/2010 |
| JP | 2011-058796 | 11/2010 |
| JP | 2011-058796 | 3/2011 |
| JP | 2012-131512 | 7/2012 |
| JP | 2014-081125 | 5/2014 |
| WO | WO 2008/068588 A2 | 6/2008 |
| WO | WO 2012/020098 A2 | 2/2012 |

OTHER PUBLICATIONS

International Search Report for PCT Application No. PCT/JP2014/078957 dated Feb. 3, 2015, in 3 pages.

* cited by examiner

REFRIGERATED STORAGE UNIT

RELATED APPLICATIONS

Any and all applications for which a foreign or domestic priority claim is identified in the Application Data Sheet as filed with the present application are hereby incorporated by reference under 37 CFR 1.57.

BACKGROUND

Technical Field

The present invention relates to a refrigerated storage unit.

Related Art

A food product such as seafood, produce (vegetable and fruit), meat and the like can easily lose their freshness, but it is necessary to maintain the freshness for a relatively long period of time from the time of harvesting or the like to distribution and displaying in a store. Moreover, such a food product is more preferred by a customer when the freshness is higher, and therefore the food product needs to be displayed in the store with the freshness maintained.

Conventionally, attempts have been made to maintain the freshness of the food product by using a freezer or the like to freeze or refrigerate the food product (for example, see patent document 1). However, when the food product is frozen, a cell membrane of the food product is destroyed, resulting in a problem of a decrease in flavor of the food product. Furthermore, the freezer, a refrigerator and the like (a refrigerated storage unit) perform temperature management by turning the power to a compressor ON or OFF or through inverter control. For this reason, a range of temperature error and temperature differences among locations within the refrigerated storage unit are large, and thus a problem has existed of not being able to perform a precise temperature adjustment. Therefore, if the refrigerated storage unit is regulated to a temperature at which freezing does not occur, in some cases the temperature may become relatively high, and it has been difficult to sufficiently maintain the freshness. Furthermore, temperature unevenness at each location within the refrigerated storage unit often occurs depending on a location where the food product is provided, a method of providing the food product, and the like. For this reason, another problem has existed that a temperature of one location becomes much higher than a set temperature, while a temperature of another location becomes much lower than the set temperature.

In particular, if the food product is transported while refrigerating it with the refrigerated storage unit installed on a truck pallet, or if the food product is transported while refrigerating it using a container with a refrigeration system loaded on a ship, cold air is not uniformly distributed within the refrigerated storage unit depending on a position and the like of the food product within the refrigerated storage unit. Thus, a problem that cooling unevenness occurs within the refrigerated storage unit has existed. In the summertime particularly, a temperature of a location where the cold air does not reach can becomes 20° C. or higher, and this can damage the food product.

The Patent Document 1 is JP-A 2010-43763

SUMMARY

It is therefore an object of the present invention to provide a refrigerated storage unit capable of maintaining the freshness of its content (particularly food product).

The above object is achieved by the following inventions.

(1) A refrigerated storage unit comprising:
a refrigeration chamber;
a refrigeration part for cooling air inside the refrigeration chamber;
a blower part for sending cold air cooled by the refrigeration part into the refrigeration chamber;
an in-chamber temperature detection part for detecting a temperature inside the refrigeration chamber;
a food temperature detection part for detecting a temperature of a content provided inside the refrigeration chamber; and
a control part for controlling driving of the blower part based on a result detected by at least one of the in-chamber temperature detection part and the food temperature detection part.

(2) The refrigerated storage unit described in the above-mentioned invention (1) further comprising a position detection part for detecting a position of the content inside the refrigeration chamber.

(3) In the refrigerated storage unit described in the above-mentioned invention (1) or (2), the blower part includes a first blower part and a second blower part;
and a flow of the cold air blown from the first blower part is able to varied by the cold air blown from the second blower part.

(4) In the refrigerated storage unit described in any one of the above-mentioned inventions (1) to (3), the control part includes a first control mode for controlling the driving of the blower part such that the temperature inside the refrigeration chamber is maintained within a prescribed temperature range, and a second control mode for controlling the driving of the blower part such that the content is refrigerated at a prescribed temperature or below.

(5) In the refrigerated storage unit described in the above-mentioned invention (4), when the temperature of the content is higher than the prescribed temperature, the control part controls the driving of the blower part with the second control mode, and after the temperature of the content becomes within the prescribed temperature range, the control part controls the driving of the blower part with the first control mode.

(6) In the refrigerated storage unit described in the above-mentioned invention (4) or (5), an amount of the cold air blown from the blower part toward the content with the second control mode is larger than that with the first control mode.

(7) The refrigerated storage unit described in any one of the above-mentioned inventions (4) to (6) comprising a plurality of the in-chamber temperature detection parts, wherein the control part controls the driving of the blower part with the first control mode such that temperature differences among the in-chamber temperature detection parts are lowered.

(8) The refrigerated storage unit described in any one of the above-mentioned inventions (1) to (7) further comprising a duct for suctioning the cold air inside the refrigeration chamber.

(9) In the refrigerated storage unit described in the above-mentioned invention (8), the duct is provided with a plurality of openings along a direction of flow of the cold air;
and each opening surface area of the openings positioned at an upstream side of the direction of flow is larger than each opening surface area of the openings positioned at a downstream side.

According to the present invention, it is possible to detect the temperature of the content stored inside the refrigeration chamber in addition to the temperature of the refrigeration chamber. Thus, the content can be more reliably refrigerated and maintained at the prescribed temperature range. In particular, if the temperature of the content is high, the content is refrigerated first with priority, and once the temperature of the content has been sufficiently lowered, the temperature inside the refrigeration chamber is maintained almost uniformly and within the prescribed temperature range. This makes it possible to rapidly refrigerate the content, and the abovementioned effects become more remarkable.

DETAILED DESCRIPTION

A preferred embodiment of a refrigerated storage unit according to the present invention is described in detail below with reference to the attached drawings.

Figure 1:
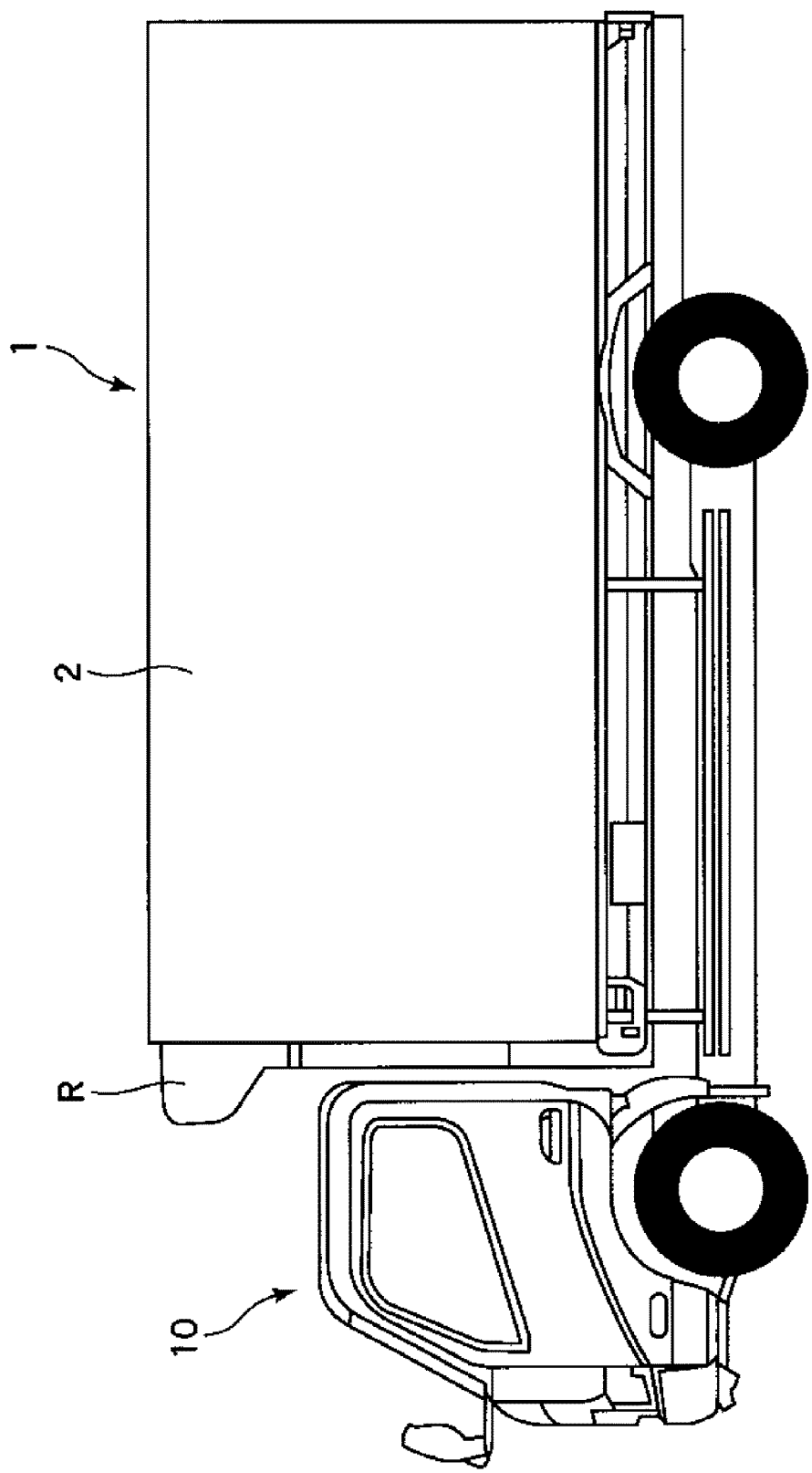
FIG. 1 is a view showing a preferred embodiment of a refrigerated storage unit according to the present invention.
Figure 2:
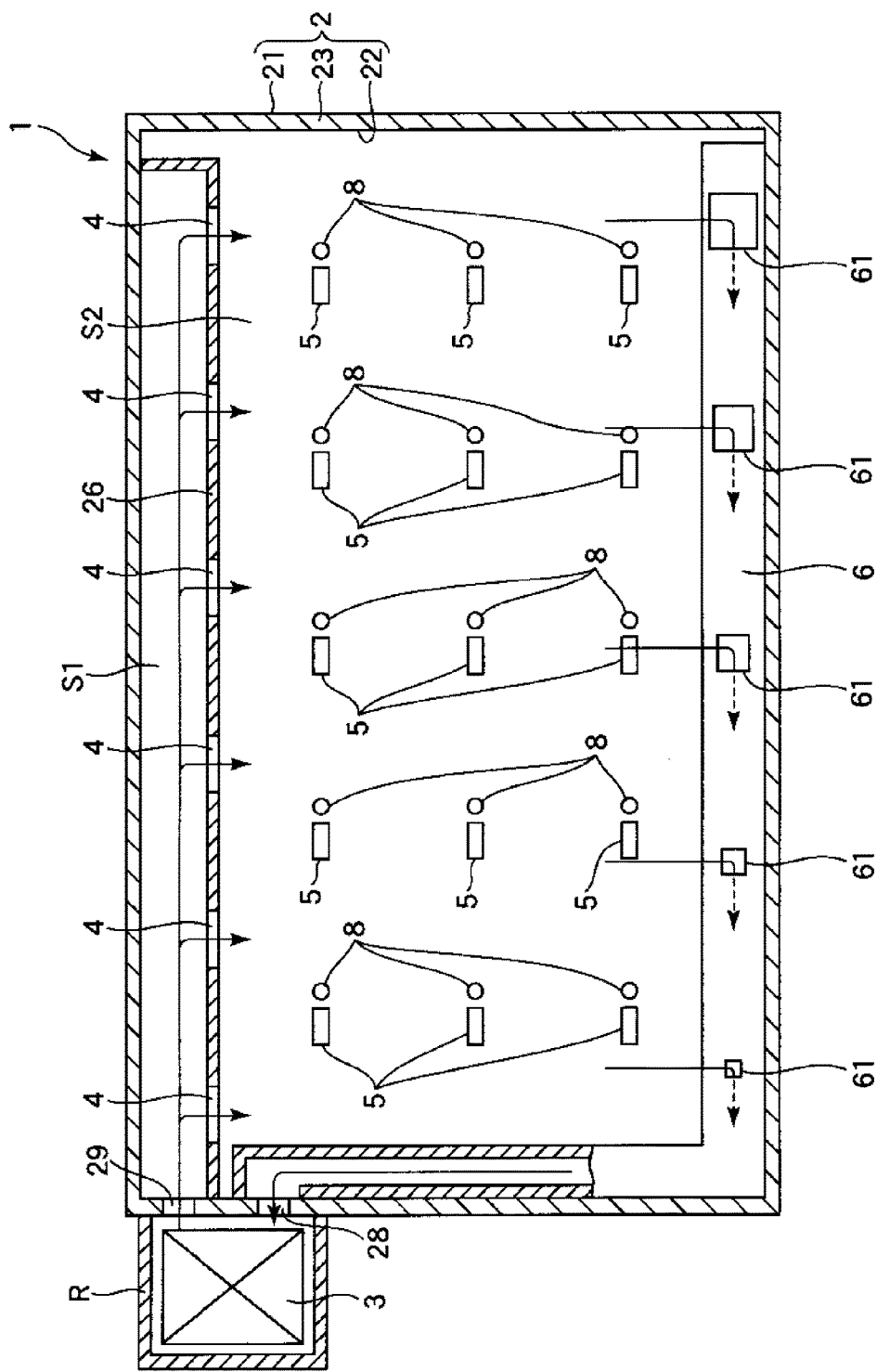
FIG. 2 is a vertical cross-sectional view of the refrigerated storage unit shown in FIG. 1.
Figure 3:
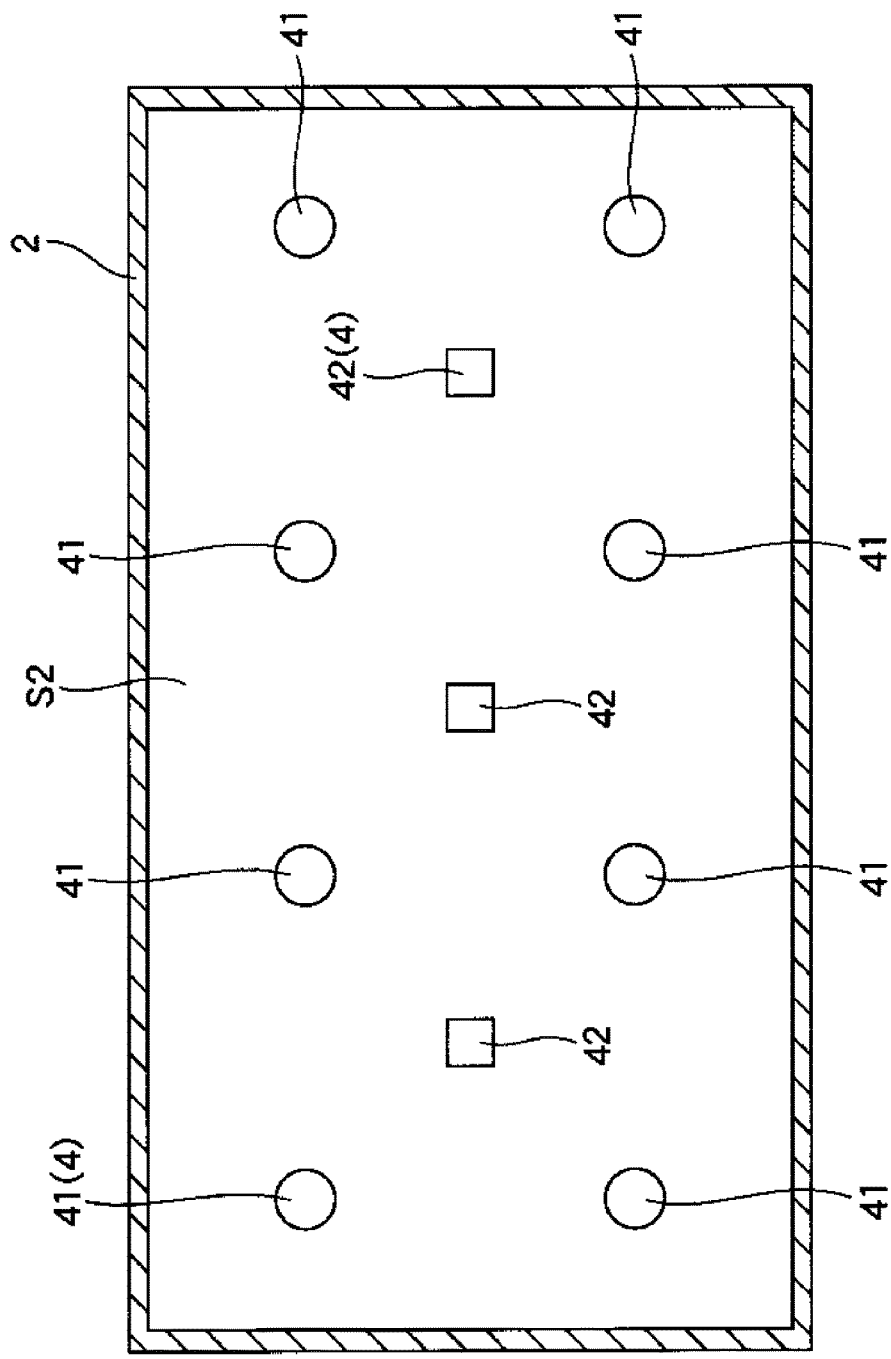
FIG. 3 is a horizontal cross-sectional view of the refrigerated storage unit shown in FIG. 1.
Figure 4:
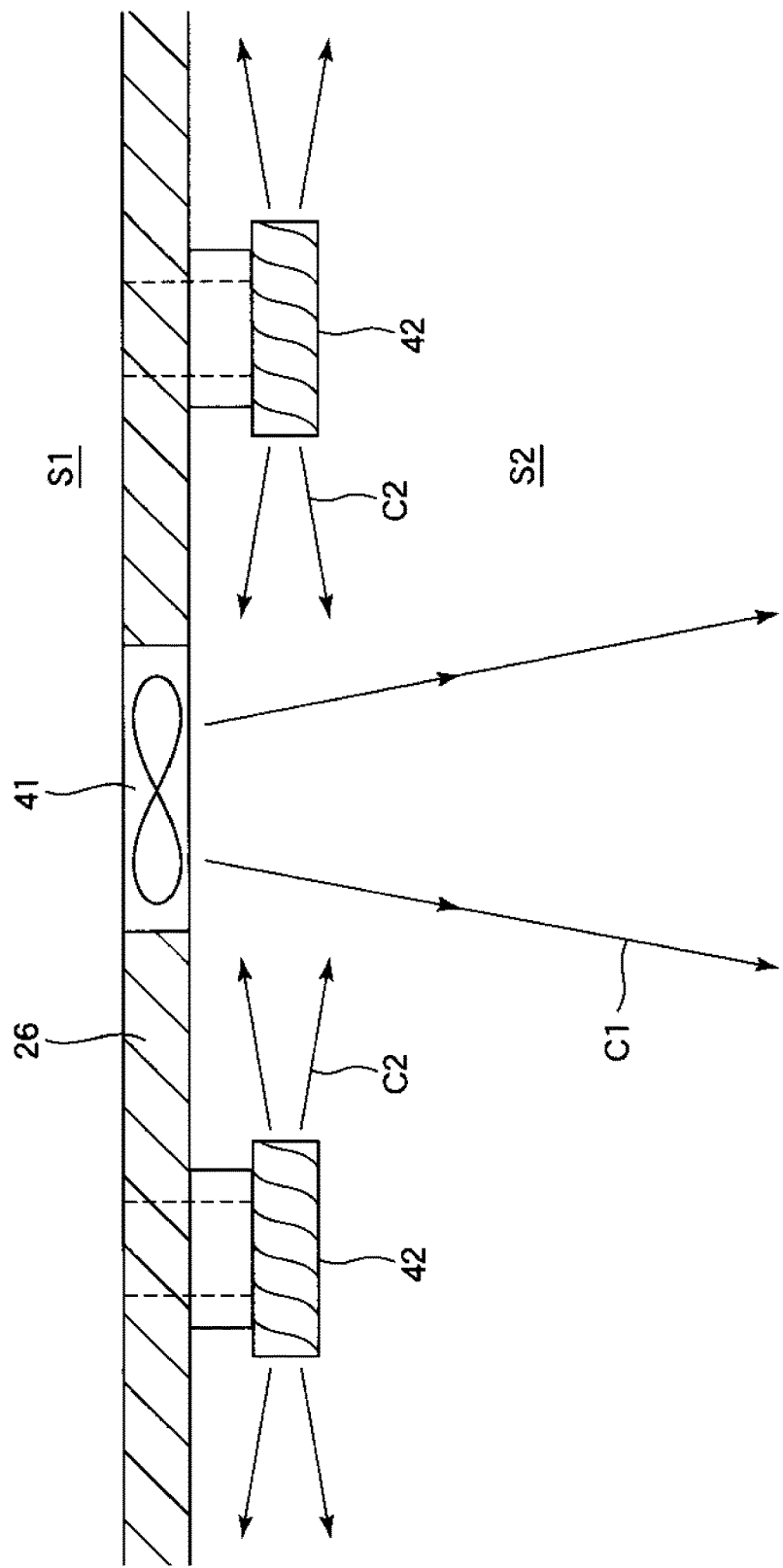
FIG. 4 is a view explaining structures of fans which the refrigerated storage unit shown in FIG. 1 includes.
Figure 5:
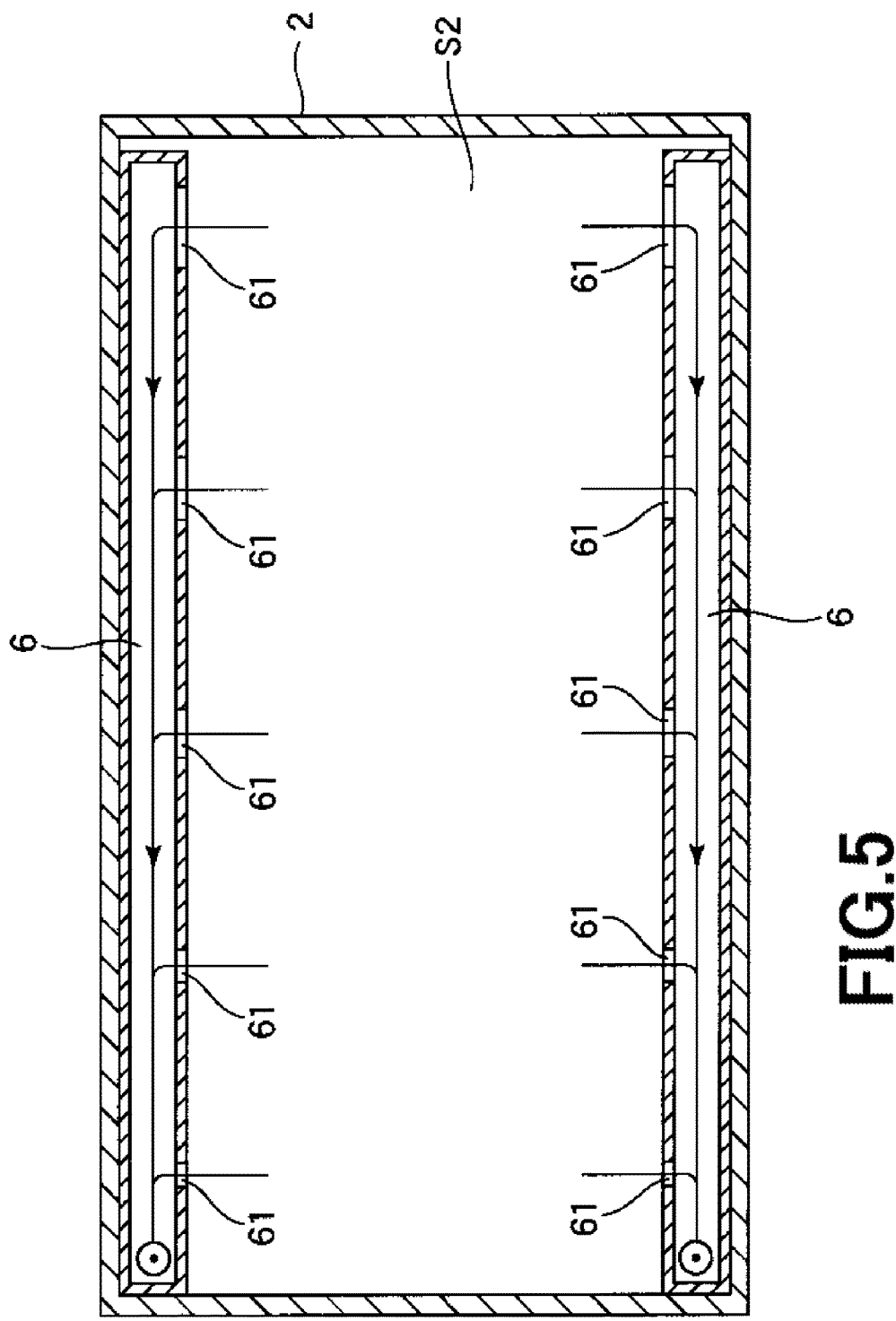
FIG. 5 is a view explaining structures of ducts which the refrigerated storage unit shown in FIG. 1 includes.
Figure 6:
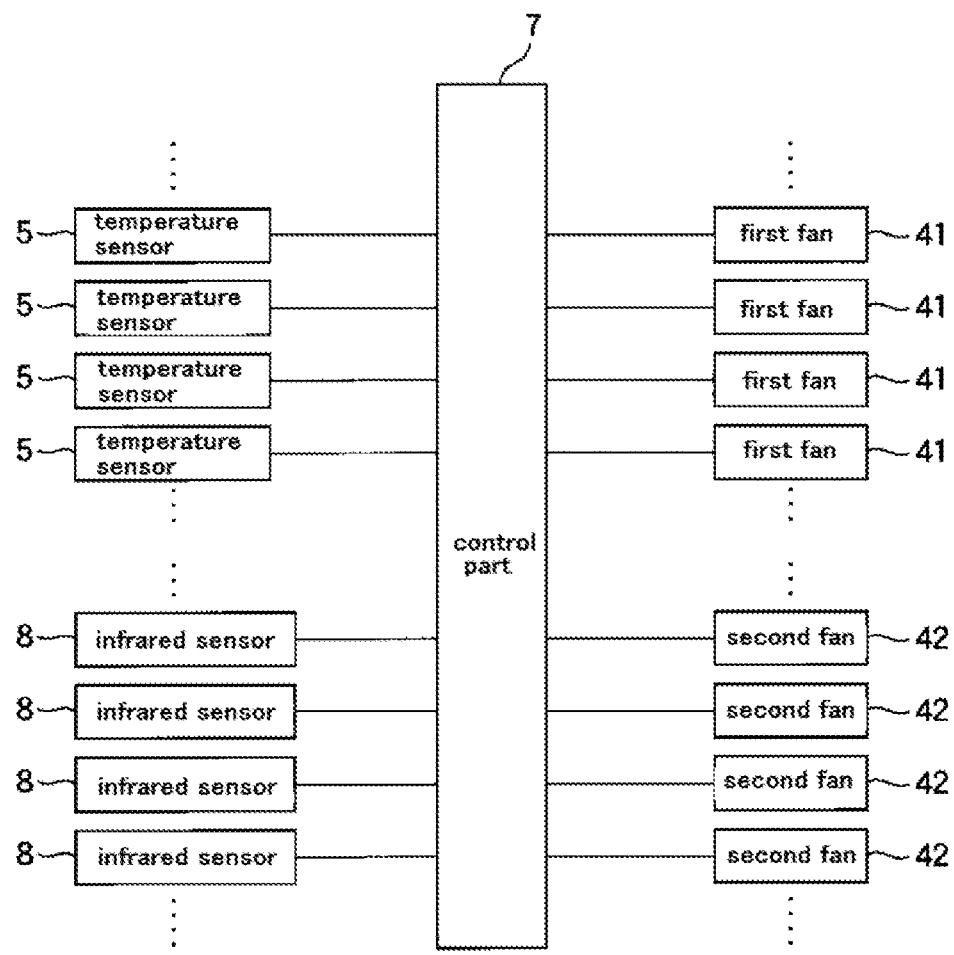
FIG. 6 is a block diagram explaining a control part which the refrigerated storage unit shown in FIG. 1 includes.
Figure 7:
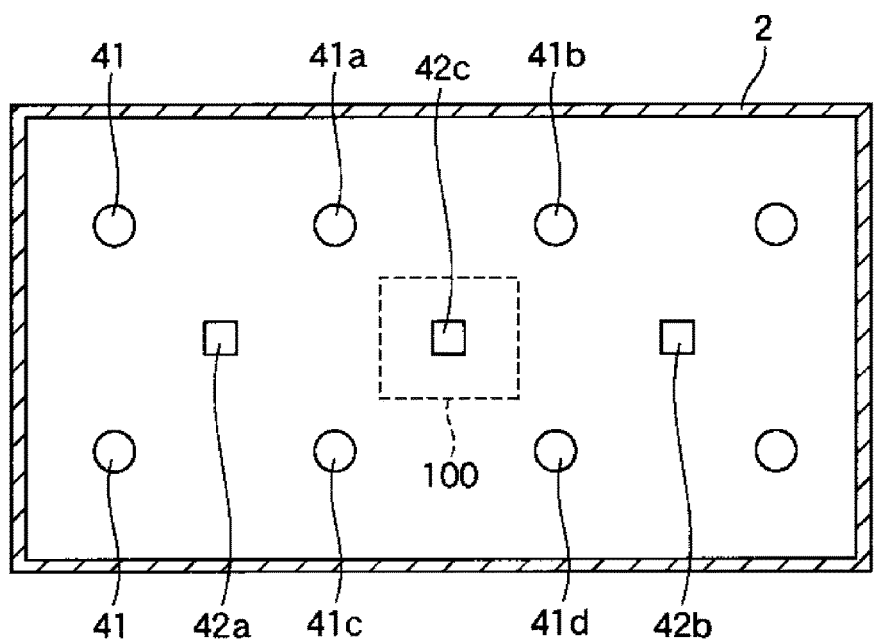
FIG. 7 is a top view for explaining one example of control of the control part shown in FIG. 6.
Figure 8:
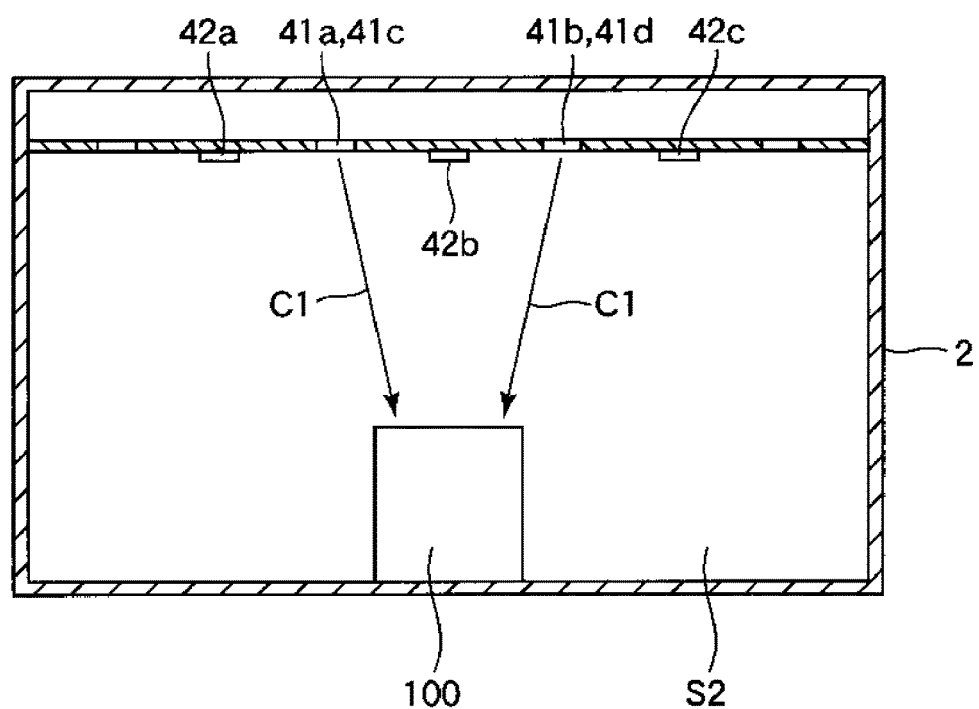
FIG. 8 is a side view for explaining one example of the control of the control part shown in FIG. 6.
Figure 9:
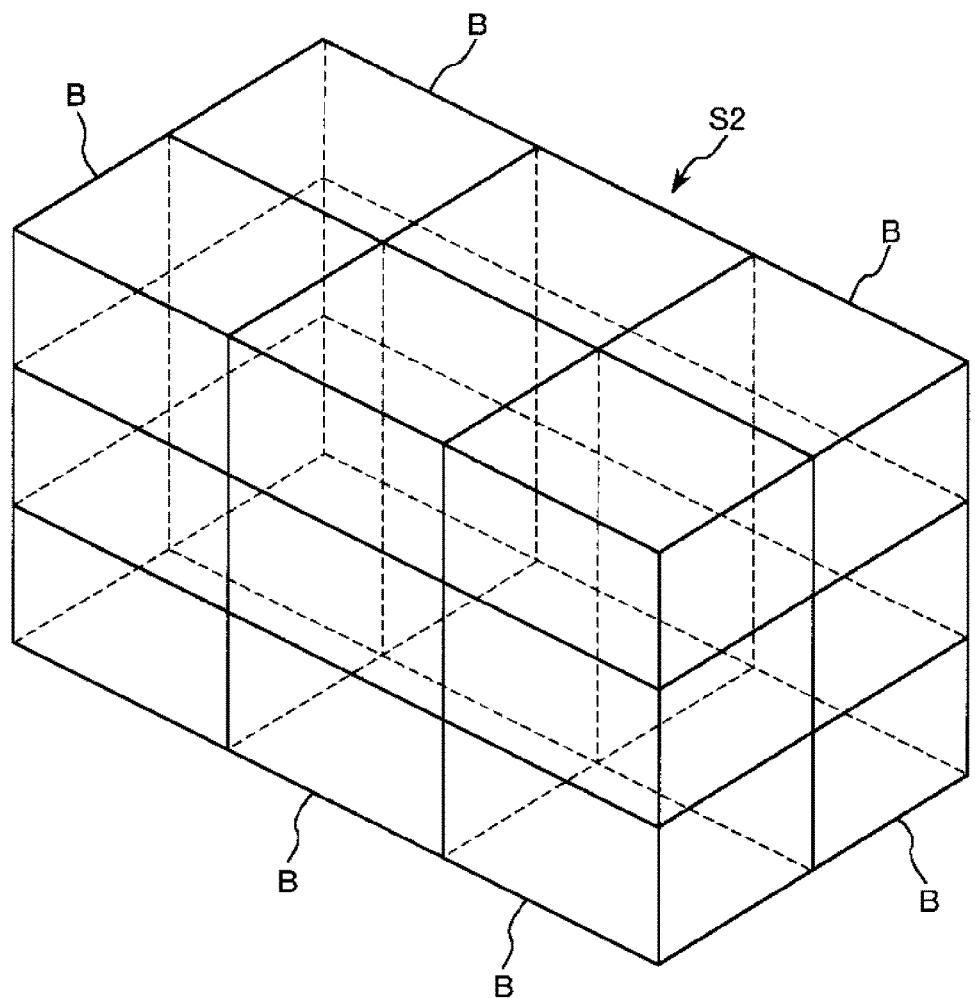
FIG. 9 is a perspective view for explaining one example of the control of the control part shown in FIG. 6.

FIG. 1 is a view showing a preferred embodiment of a refrigerated storage unit according to the present invention. FIG. 2 is a vertical cross-sectional view of the refrigerated storage unit shown in FIG. 1. FIG. 3 is a horizontal cross-sectional view of the refrigerated storage unit shown in FIG. 1. FIG. 4 is a view explaining structures of fans which the refrigerated storage unit shown in FIG. 1 includes. FIG. 5 is a view explaining structures of ducts which the refrigerated storage unit shown in FIG. 1 includes. FIG. 6 is a block diagram explaining a control part which the refrigerated storage unit shown in FIG. 1 includes. FIG. 7 is a top view for explaining one example of control of the control part shown in FIG. 6. FIG. 8 is a side view for explaining one example of the control of the control part shown in FIG. 6. FIG. 9 is a perspective view for explaining one example of the control of the control part shown in FIG. 6. It is to be noted that in the following description, the top side in FIG. 1 will be referred to as "top", and the bottom side therein will be referred to as "bottom".

The refrigerated storage unit according to the present invention can be used, for example, as a fixed type refrigerated storage unit installed inside a food processing plant, a food storage warehouse, or the like, and can also be used as a mobile type refrigerated storage unit loaded on a moving body such as a ship, airplane, train, vehicle, or the like. In particular, the refrigerated storage unit according to the present invention is preferably used as the latter mobile type refrigerated storage unit (for example, a refrigerated truck 10 as shown in FIG. 1). A cooling performance of the mobile type refrigerated storage unit is extremely affected by an external environment (air temperature, weather, shaded/sunny conditions) and the like. For this reason, for example, in the summertime when the air temperature is high, at a time when passing near the equator, or the like, it has been very difficult to sufficiently and uniformly cool an inside of a refrigerated storage unit. Furthermore, circulation of cold air is hindered depending on the quantity and positioning of goods loaded in the refrigerated storage unit. Thus, it has been very difficult to uniformly cool the entire inside of the refrigerated storage unit. In contrast, the refrigerated storage unit according to the present invention nearly cannot be affected by the external environment and the conditions inside the refrigerated storage unit, and the inside of the refrigerated storage unit can be sufficiently and uniformly cooled. From this point, it can be said that the refrigerated storage unit according to the present invention is particularly suited for the mobile type refrigerated storage unit.

Furthermore, a content that can be stored in the refrigerated storage unit according to the present invention is not particularly limited. However, examples of the content include a food product, a fresh flower (including a seed, a bulb, and the like), a medicinal product (such as a drug and blood), and the like. Hereinafter, as a matter of description convenience, the preferred embodiment will be described representatively for a case in which the content is the food product. The food product is not particularly limited, and examples thereof include: fish, shrimp, squid, octopus, sea cucumber, shellfish, and other types of seafood and processed foods such as fillets of them; strawberries, apples, mandarin oranges, Asian pears, and other such fruit; cabbage, lettuce, cucumbers, tomatoes, and other vegetables; beef, pork, chicken, horse meat and other meats; and other such fresh foods; as well as noodles and the like made from wheat flour, rice flour, buckwheat flour and other grain flours. It is to be noted that hereinafter, the fruit and the vegetable will be referred to collectively as produce. In addition, a case in which the content is the food product is described as an example below.

As shown in FIG. 2, a refrigerated storage unit 1 includes a main body 2 having an outer wall 21 and an inner wall 22 constituted from, for example, aluminum, stainless steel, or the like, and a heat insulating material 23 filled between the outer wall 21 and the inner wall 22. The structure of the main body 2 is of course not limited to this. The main body 2 is also equipped with a door which is not illustrated. By opening and closing this door, the food product can be loaded into the main body 2, and removed from the main body 2. It is to be noted that the installation location of the door is not particularly limited, and for example, may be provided on a side wall of the main body 2, may be provided on a ceiling thereof, and may be provided on a floor thereof. Moreover, a structure of the door is not particularly limited as long as the food product can be loaded into and removed from the refrigerated storage unit through the door. For example, the door may be a hinged door, a sliding door, or a shutter type door.

Furthermore, a box-shaped top plate 26 is provided on the ceiling inside the main body 2, and the inside of the main body 2 is partitioned into a space inside the top plate 26 and a space outside the top plate 26. Furthermore, the space inside the top plate 26 functions as a guidance passage S1 for guiding the cold air (cooling air), and the space outside the top plate 26 functions as a refrigeration chamber S2 for storing the food product. The size of the refrigeration chamber S2 is not particularly limited, and for example, a relatively large volume of around 150 m³ to 1000 m³ is suitable.

Moreover, the refrigerated storage unit 1 also includes a refrigeration part 3 for cooling air inside the refrigeration chamber S2 and which is provided in a machine room R positioned outside the main body 2. The refrigeration part 3 is not particularly limited as long as it is capable of cooling the air, and for example, a mechanism ordinarily used as a cooling system such as a refrigerator, freezer, and air conditioner can be used. An example of the refrigeration part 3 will be explained in a simplified manner as follows. The refrigeration part 3 has a refrigerant pipe filled with refrigerant, a cooler, a compressor and a condenser which are connected by the refrigerant pipe. The refrigeration part 3 can cool the inside of the refrigeration chamber S2 by repeating a refrigeration cycle in which the refrigerant catches the heat of the air at the cooler, the refrigerant catching the heat is compressed at the compressor, and the heat discharged to outside air at the condenser.

Moreover, an introduction port 28 for introducing the air inside the refrigeration chamber S2 into the refrigeration part 3, and an air-outlet port 29 for blowing the air cooled by the refrigeration part 3 into the guidance passage S1 are provided on a wall at a boundary between the machine room R and the main body 2. In addition, fans (not illustrated) are respectively provided at the introduction port 28 and the air-outlet port 29 such that introducing the air and blowing the cold air can be smoothly performed.

Furthermore, a plurality of fans (blower parts) 4 are provided on the top plate 26. Each fan 4 functions to send the cold air, which is supplied from the refrigeration part 3 to the inside of the guidance passage S1 via the air-outlet port 29, into the refrigeration chamber S2. It is to be noted that a plurality of ducts connecting the air-outlet port 29 of the refrigeration part 3 and each fan 4 may also be provided inside the guidance passage S1 such that the cold air blown by the refrigeration part 3 is guided uniformly to each fan 4. On the other hand, ducts 6 for taking in the cold air sent to the refrigeration chamber S2 and guiding it to the refrigeration part 3 are provided in the floor of the main body 2. Through such a structure, the cold air in the main body 2 can be circulated through the refrigeration chamber S2, the ducts 6, the refrigeration part 3, and the guidance passage S1, in that order as shown by the arrow in FIG. 2. For that reason, the refrigeration chamber S2 can be efficiently cooled.

Next, the fans 4 are described in detail. As shown in FIG. 3, the plurality of fans 4 provided on the top plate 26 includes first fans (first blower parts) 41 and second fans (second blower parts) 42. It is to be noted that in FIG. 3, as a matter of description convenience, each first fan 41 is illustrated as a circle, and each second fan 42 is illustrated as a square.

As shown in FIG. 4, the first fan 41 is a fan configured so as to send cold air C1 toward a floor surface of the refrigeration chamber S2, in other words, toward a lower side in a nearly vertical direction. On the other hand, the second fan 42 is a fan (for example, a centrifugal fan) configured so as to send cold air C2 toward a nearly horizontal direction. The second fan 42 is positioned lower than the first fan 41, and thus the cold air C2 blown from the second fan 42 hits the cold air C1 blown from the first fan 41. This makes it possible to reduce blowing unevenness of the cold air in the refrigeration chamber S2, and to more uniformly cool the inside of the refrigeration chamber S2. Furthermore, conversely, the cold air C1 blown from the first fan 41 can be guided to a prescribed location by the cold air C2, and thus it is also possible to cool the prescribed location with priority (in a concentrated manner). In this regard, the second fan 42 not only blows the cold air C2 toward the cold air C1 blown from the first fan 41, but can also be driven so as to suction in the cold air C1 blown from the first fan 41 under a prescribed condition. In addition, the second fan 42 can have a structure in which a blowing direction thereof can be varied by having, for example, an "oscillating mechanism" like that used in an ordinary blower. Through this, the matter of cooling the prescribed location with priority (in the concentrated manner) as described above can be more easily achieved.

Moreover, as shown in FIG. 3, in a plan view as viewed from the vertical direction, the first fans 41 and the second fans 42 are respectively arranged almost uniformly to spread out nearly the entire range of the refrigeration chamber S2. Layout of the first fans 41 and the second fans 42 is not particularly limited, but in the present embodiment, the first fans 41 are arranged in matrix, and the second fans 42 are arranged between them. It is to be noted that in the present embodiment, eight first fans 41 are arranged, and three second fans 42 are arranged. However, the number of the first fans 41 and second fans 42 is not limited thereto.

Furthermore, layout density of the first fans 41 is not particularly limited, and differs depending on the size and power of each first fan 41. However, for example, the layout density thereof is preferably around 250 cm² to 1 m²/fan from a plan view. The same applies to layout density of the second fans 42. Moreover, flow rate of the cold air sent by each of the first fans 41 and the second fans 42 is not particularly limited. However, for example, the flow rate near (directly below) the fan is preferably around 0.01 to 2.0 m/second, and is more preferably around 0.1 to 0.5 m/second. By adopting the flow rate of around this level, the refrigeration chamber S2 can be sufficiently cooled, and a gentle flow of the cold air can be achieved.

Next, the ducts 6 are described in detail. As shown in FIG. 5, one duct 6 each (total of two) is provided on both sides of the refrigeration chamber S2. One end part of each duct 6 is closed, and the other end parts on the opposite sides of the ducts 6 are integrated into a single body and connected to the introduction port 28. Moreover, a plurality of openings 61 are formed in a side wall of a portion of each duct 6 arranged along the floor. The cold air inside the refrigeration chamber S2 can be guided from these openings 61 to an inside of the duct 6.

In particular, by providing the openings 61 in the side wall of each duct 6 as with the present embodiment, the openings 61 face a nearly horizontal direction (a direction inclined with respect to the vertical direction). For this reason, the cold air that has descended from the ceiling of the refrigeration chamber S2 to the floor (namely, the cold air sufficiently supplied to cool the refrigeration chamber S2) can be guided to the insides of the ducts 6. In other words, it is possible to reduce suction of the cold air that can still be sufficiently used to cool the refrigeration chamber S2. For that reason, the refrigeration chamber S2 can be efficiently cooled. Of course, the direction of each opening 61 is not particularly limited, and the direction thereof may be inclined in the horizontal direction and the vertical direction, or may be oriented in the vertical direction.

Moreover, the plurality of openings 61 are arranged along an extension direction (a direction of flow of the cold air) of each duct 6. Further, an opening surface area of the opening 61 on a side of the one end part (an upstream side of the flow of the cold air) is larger than an opening surface area of the opening 61 on a side of the other end part (a downstream side of the flow of the cold air). In particular, with the present embodiment, the opening surface areas of the plurality of openings 61 gradually decrease from the side of the one end part (the upstream side of the flow of the cold air) to the side of the other end part (the downstream side of the flow of the cold air). This makes it possible to guide the cold air from all of the openings 61 to the insides of the ducts 6 without unevenness, and thus the cold air can be circulated inside the refrigeration chamber S2 without the unevenness.

It is to be noted that an arrangement pitch of the plurality of openings 61 is not particularly limited, and differs depending on the size and shape of the refrigeration chamber S2. However, for example, the arrangement pitch of around 500 mm to 1000 mm is preferred. Moreover, an opening shape (surface area) of the opening 61 is not particularly limited, and differs depending on the size and shape of the refrigeration chamber S2. However, for example, the opening shape can be the square shape of around vertical× horizontal: 30 mm×30 mm to 100 mm×100 mm.

In addition, as shown in FIG. 2, the refrigeration chamber S2 is provided with a plurality of temperature sensors (in-chamber temperature detection parts) 5. Through these temperature sensors 5, it is possible to detect a temperature difference ΔT of the refrigeration chamber S2 (a difference between the highest temperature and the lowest temperature inside the refrigeration chamber S2) by detecting temperatures at a plurality of different locations within the refrigeration chamber S2. Layout of the plurality of temperature sensors 5 is not particularly limited, but it is preferable that the temperature sensors 5 are arranged to spread out the entire range of the refrigeration chamber S2. It is to be noted that with the present embodiment, the temperature sensors 5 are arranged on a side wall of the refrigeration chamber S2, and are shifted from each other in a height direction of the refrigeration chamber S2. The cold air sinks downward in the vertical direction, and therefore the temperature difference can easily occur in the height direction of the refrigeration chamber S2. For that reason, the temperature difference ΔT inside the refrigeration chamber S2 can be more accurately detected by arranging the temperature sensors 5 so as to be lined up in the height direction. Such temperature sensors 5 are not particularly limited as long as it is capable of detecting the temperature, and for example, a thermocouple can be used.

As shown in FIG. 2, a plurality of infrared sensors (content (food) temperature detection parts, content position detection parts) 8 are also provided in the refrigeration chamber S2. The infrared sensors 8 can detect a temperature of the food product stored inside the refrigeration chamber S2. The above-described temperature sensors 5 can detect a temperature near the food product, but it is difficult for the temperature sensors 5 to detect the temperature of the food product itself. Therefore, the infrared sensors 8 are also provided in addition to the temperature sensors 5. Thereby, it is possible to detect the temperature of food product in the refrigeration chamber S2 in addition to the temperature inside the refrigeration chamber S2. In this regard, the temperature of the food product may be the temperature of the food product itself (for example, a surface temperature of the food product), or may be a surface temperature of a packaging box if the food product is packaged in the packaging box such as a cardboard box or the like.

It is to be noted that with the present embodiment, the infrared sensors are used as the content temperature detection parts, but the content temperature detection parts are not limited to the infrared sensors as long as it is possible to detect the temperature of the food product inside the refrigeration chamber S2. Furthermore, if the above-described temperature sensors 5 can detect a position and condition of the food product, the temperature sensors 5 can also be used as the content temperature detection parts. In this case, the infrared sensors 8 may be omitted.

Furthermore, the refrigerated storage unit 1 is also configured such that it can detect the position and condition of the food product inside the refrigeration chamber S2 based on information from the plurality of infrared sensors 8. Through this, for example, it is possible to blow the cold air toward the food product as described below. Thus, when necessary, the food product can be refrigerated with priority. It is to be noted that with the present embodiment, the infrared sensors are used as the content position detection parts. However, the content position detection parts are not limited to the infrared sensors as long as it is capable of detecting the position and condition of the food product inside the refrigeration chamber S2. For example, an image recognition technology using a camera or other such imaging device may be used.

Furthermore, as shown in FIG. 6, the refrigerated storage unit 1 includes a control part 7 for controlling driving of each fan 4 (each of the first fans 41 and second fans 42) so as to move independently based on detection results from the temperature sensors 5 and the infrared sensors 8. The control part 7 has a first control mode for controlling the driving of each fan 4 such that the temperature inside the refrigeration chamber S2 is maintained within a prescribed temperature range, and a second control mode for controlling the driving of each fan 4 such that the food product inside the refrigeration chamber S2 is refrigerated at a prescribed temperature or below. An amount of the cold air blown from the fan 4 toward the food product in the second control mode is larger than that of the first control mode. Because of that larger amount of the cold air, the second mode can refrigerate the food product more rapidly (in a shorter amount of time) than the first control mode. An example of temperature control by the control part 7 is described below with a presentation of a specific example.

For example, as shown in FIG. 7 and FIG. 8, when a food product 100 is stored in the refrigeration chamber S2 maintained within the prescribed temperature range suited for the preservation of the food product 100, the control part 7 detects the temperature of the food product 100 and the position thereof within the refrigeration chamber S2 based on the information (signals) from the plurality of infrared sensors 8. If the temperature of the food product 100 is higher than the prescribed temperature range, the temperature inside the refrigeration chamber S2 rises due to heat from the food product 100, and temperature unevenness is generated. In order to reduce damage to the food product 100, it is also necessary to rapidly refrigerate the food product 100.

Therefore, if the temperature of the food product 100 is higher than the prescribed temperature range, the control part 7 controls the driving of each fan 4 with the second control mode. Thereby, the food product 100 is refrigerated in the concentrated manner, and the food product 100 is rapidly refrigerated. More specifically, if the food product 100 is arranged for example as shown by FIG. 7 and FIG. 8, the control part 7 lowers an output of the second fan 42b such that the output thereof is lower than an output of each of the second fans 42a and 42c. Moreover, instead of such a control, the control part 7 drives the second fan 42b such that it rotates in reverse and suctions in the cold air. When this is done, the cold air C1 from the first fans 41a to 41d is affected by air flow which generates in the second fans 42, and thus the cold air C1 flows toward the food product 100. As a result, the food product 100 is refrigerated in the concentrated manner.

While the temperature of the food product 100 is fed back, such a refrigeration with the second control mode is continued, for example, until the temperature of the food product 100 is within the prescribed temperature range. Furthermore, when the temperature of the food product 100 becomes within the prescribed temperature range, the control part 7 switches from the second control mode to the first control mode and controls the driving of each of the fans 4. In other words, the control part 7 stops the preferential refrigeration of the food product 100, maintains the temperature inside the refrigeration chamber S2 within the prescribed temperature range, and cools the inside of the refrigeration chamber S2 such that the temperature difference ΔT becomes smaller. Specifically, for example, the control part 7 controls the driving (the output) of each of the first fans 41 and each of the second fans 42 so as to move independently such that the temperature of each temperature sensor 5 becomes within the prescribed temperature range, and the temperature differences among the temperature sensors 5 are lowered as much as possible. Furthermore, for example, the control part 7 controls the driving (the output) of each of the first fans 41 and each of the second fans 42 so as to move independently such that as shown in FIG. 9, the refrigeration chamber S2 is virtually split into a plurality (eighteen in the present embodiment) of blocks (regions) B, the temperature of each block B becomes within the prescribed temperature range, and the temperature differences among the blocks B are lowered as much as possible. By continuing cooling with such a first control mode, the food product 100 can be stored for a long period of time within the prescribed temperature range.

Of course, the temperature (the prescribed temperature range) of the refrigeration chamber S2 is not particularly limited. However, when a freezing temperature of the food product is Tf (° C.), the temperature of the refrigeration chamber S2 is preferably Tf−2.0° C. to Tf+2.0° C., and is more preferably Tf−1.0° C. to Tf+1.0° C. In this regard, if the food product is the produce, in some cases the food product may be damaged at low temperatures. Therefore, the temperature of the refrigeration chamber S2 in this case is preferably Tf−2.0° C. to Tf+15.0° C. Here, moisture contained in the food product is a solution in which some type of solute is dissolved, and therefore a freezing point is lowered. For that reason, the freezing temperature of the general food product is around −5° C. to 0° C. Accordingly, in the case of such a food product, the temperature of the refrigeration chamber S2 can be around −6.0° C. to 15.0° C., and can be preferably around −3° C. to 0° C. Through this, degradation of the flavor of the food product can be more effectively prevented, and the freshness of the food product can be maintained for a longer period of time.

In addition, according to the refrigerated storage unit 1, the temperature difference ΔT inside the refrigeration chamber S2 can be lowered to be small. For this reason, the temperature of the refrigeration chamber S2 can be set at a lower temperature while preventing freezing of the food product (damage to a cell wall of the food product through freezing). Through this, the freshness of the food product can be maintained for a longer period of time. It is to be noted that the smaller temperature difference ΔT is preferable. Specifically, the temperature difference ΔT is preferably within 2.0° C., more preferably within 0.5° C., and even more preferably 0° C. The abovementioned effects become more remarkable by setting the temperature difference ΔT to within such a numeric range.

The refrigerated storage unit 1 has been described above, but for example, the refrigerated storage unit 1 can also include a controller for monitoring and setting the temperature inside the refrigeration chamber S2. For example, the controller thereof is provided with an input unit for inputting a temperature setting, a display unit for displaying matters such as the temperature inside the refrigeration chamber S2 and the layout of food products, and the like. By including such a controller, the conditions inside the refrigeration chamber S2 can be easily understood, and the refrigerated storage unit 1 can be designed with greater reliability. It is to be noted that in the case of the refrigerated truck 10 like that shown in FIG. 1, for example, the controller is preferably attached at a position where a driver can operate and visually confirm the controller while the driver sits in a driver's seat.

The refrigerated storage unit according to the present invention has been described above based on the illustrated embodiment, but the present invention is not limited thereto. For example, the structure of each part can be replaced with an optional structure which exhibits the same functions, and the optional structures can also be added.

Furthermore, in the above-described embodiment, the fans have been used as the blower parts, but spray nozzles and the like may also be used in place of the fans. Moreover, the above-described control part may also control driving (for example, ON/OFF) of the refrigeration part in addition to controlling the plurality of fans.

INDUSTRIAL APPLICABILITY

The refrigerated storage unit according to the present invention is characterized by including a refrigeration chamber; a refrigeration part for cooling air inside the refrigeration chamber; a blower part for sending cold air cooled by the refrigeration part into the refrigeration chamber; an in-chamber temperature detection part for detecting a temperature inside the refrigeration chamber; a food temperature detection part for detecting a temperature of a content provided inside the refrigeration chamber; and a control part for controlling driving of the blower part based on a result detected by at least one of the in-chamber temperature detection part and the food temperature detection part. For that reason, it is possible to detect the temperature of the content stored inside the refrigeration chamber in addition to the temperature of the refrigeration chamber. Thus, the content can be more reliably refrigerated and stored at a prescribed temperature range. In particular, if the temperature of the content is high, the content is refrigerated first with priority, and once the temperature of the content has been sufficiently lowered, the temperature inside the refrigeration chamber is maintained almost uniformly and within the prescribed temperature range. This makes it possible to rapidly refrigerate the content, and the above-mentioned effects become more remarkable.

Therefore, the refrigerated storage unit according to the present invention has industrially applicable.

EXPLANATION OF REFERENCE NUMERAL

1: refrigerated storage unit
10: refrigerated truck
100: food product
2: main body 21: outer wall
22: inner wall
23: heat insulating material
26: top plate
28: introduction port
29: air-outlet port
3: refrigeration part
4: fan
41, 41a to 41d: first fans
42, 42a to 42c: second fans
5: temperature sensor
6: duct
61: openings
7: control part
8: infrared sensor
B: block
C1, C2: cold air
R: machine room
S1: guidance passage
S2: refrigeration chamber
ΔT: temperature difference

What is claimed is:

1. A refrigerated storage unit comprising:
a refrigeration chamber comprising an internal chamber;
a cooling system for cooling air inside the internal chamber to provide cold air;
a blower system for sending the cold air through a guidance passage above a top plate provided inside the internal chamber into the internal chamber, wherein the blower system includes a first blower and a second blower,
wherein the first blower is provided in the top plate, and wherein the second blower is provided inside the internal chamber below the top plate,
wherein the first blower blows a first flow of the cold air toward a lower side of the internal chamber in a vertical direction,
wherein the first flow of the cold air is able to be varied by a second flow of air blown from the second blower in a horizontal direction;
an in-chamber temperature sensor provided in the internal chamber for detecting a temperature inside the internal chamber;
a food temperature sensor provided inside the internal chamber for detecting a temperature of a content provided inside the internal chamber; and
a controller for controlling driving of the blower system based on a result detected by at least one of the in-chamber temperature sensor and the food temperature sensor.

2. The refrigerated storage unit according to claim 1 further comprising a position sensor for detecting a position of the content inside the internal chamber.

3. The refrigerated storage unit according to claim 1, wherein the controller includes a first control mode for controlling the driving of the blower system such that the temperature inside the internal chamber is maintained within a prescribed temperature range, and a second control mode for controlling the driving of the blower system such that the content is refrigerated at a prescribed temperature or below.

4. The refrigerated storage unit according to claim 3, wherein when the temperature of the content is higher than the prescribed temperature, the controller controls the driving of the blower system with the second control mode, and after the temperature of the content becomes within the prescribed temperature range, the controller controls the driving of the blower system with the first control mode.

5. The refrigerated storage unit according to claim 3, wherein an amount of the cold air blown from the blower system toward the content with the second control mode is larger than that with the first control mode.

6. The refrigerated storage unit according to claim 3 comprising a plurality of the in-chamber temperature sensors, wherein the controller controls the driving of the blower system with the first control mode such that temperature differences among the in-chamber temperature sensors are lowered.

7. The refrigerated storage unit according to claim 1 further comprising a duct for suctioning the cold air inside the internal chamber.

8. The refrigerated storage unit according to claim 7,
wherein the duct is provided with a plurality of openings along a direction of flow of the cold air, and
each opening surface area of the openings positioned at an upstream side of the direction of flow is larger than each opening surface area of the openings positioned at a downstream side.

9. The refrigerated storage unit according to claim 1,
wherein the guidance passage is defined by a ceiling of the refrigeration chamber and the top plate provided inside the internal chamber, the guidance passage being configured to receive the cold air from the cooling system.

10. The refrigerated storage unit according to claim 1, further comprising a plurality of the second blowers,
wherein the plurality of the second blowers are arranged around the first blower, and
wherein the plurality of the second blowers are configured to vary the first flow of the cold air by blowing air toward the horizontal direction so as to hit the first flow of the cold air blown from the first blower.

11. The refrigerated storage unit according to claim 10, wherein the plurality of the second blowers are at a lower position relative to the top plate of the internal chamber than the first blower part.

12. A refrigerated storage unit comprising:
a refrigeration chamber comprising an internal chamber;
a cooling system for cooling air inside the internal chamber to provide cold air;
a blower system for sending the cold air through a guidance passage above a top plate provided inside the internal chamber into the internal chamber;
an in-chamber temperature sensor provided in the internal chamber for detecting a temperature inside the internal chamber;
a food temperature sensor provided in the internal chamber for detecting a temperature of a content provided inside the internal chamber; and
a controller for controlling driving of the blower system based on a result detected by at least one of the in-chamber temperature sensor and the food temperature sensor,
wherein the blower system includes:
a first blower blowing a vertical flow of the cold air toward a lower side of the internal chamber in a vertical direction; and
a plurality of second blowers arranged around the first blower and blowing a plurality of horizontal flows of air toward a horizontal direction so as to hit the vertical flow of the cold air blown from the first blower,
wherein each of the first blower and the second blower are controlled by the controller so as to move independently, and wherein the vertical flow of the cold air blown from the first blower is able to be varied by changing output of one or more of the plurality of second blowers independently to each other, such that the vertical flow of the cold air blown from the first blower is guided to a prescribed location of the internal chamber so as to cool the prescribed location in a concentrated manner.

* * * * *